2,953,532

CATION EXCHANGERS OF THE POLYSTYRENE TYPE

Wolfgang Mühlberg, Gertrudisstrasse 9, Krefeld, Germany

No Drawing. Filed July 3, 1956, Ser. No. 595,594

Claims priority, application Germany July 8, 1955

8 Claims. (Cl. 260—2.2)

This invention relates to cation exchangers of the polystyrene type and to processes for preparing them.

It is known that by sulfonating polystyrene sulfonic acids thereof are obtained. The water-insoluble polystyrene is rendered water-soluble by introduction of the sulfo group which, as is known, represents the active group of strongly acid cation exchangers. However, water-soluble sulfonated polystyrenes cannot be used as exchangers, since exchangers must be insoluble in water. On the other hand, styrene or polystyrene respectively which contain a great number of benzene rings which may easily and stably be sulfonated represents a specially valuable starting material for the production of strongly acid ion exchangers. The only disadvantage of these sulfonated polystyrenes is their solubility, e.g. in water.

Gaetano F. D'Alelio has found that insoluble polystyrene sulfonic acids may be obtained when the process does not start from styrene but when styrene, i.e. monovinyl benzene, is first copolymerized with divinyl benzene in a process wherein the proportional amounts of the last mentioned component may vary between a few percents and one hundred percents. By additionally using divinyl benzene a cross-linkage or interlacing of the linear polystyrene chains is obtained. By sulfonating this copolymer prepared from monovinyl and divinyl benzene by means of the customary sulfonating agents, such as e.g. concentrated sulfuric acid, oleum or chlorosulfonic acid, insoluble polystyrene sulfonic acids are obtained which may be used as cation exchangers.

I have found that excellently useful cation exchangers are obtained by a process which comprises starting from normal, commercially available polystyrene which is not cross-linked or interlaced, sulfonating it and treating it with formaldehyde in an anhydrous acid reaction. The commercially available polystyrene is produced in large amounts for the production of die-casted plastic articles and it is sold in the form of pearls or pellets. When preparing it by a suspension polymerization process a mixture of pellets or beads of different grain size, from e.g. 0.2 to 1.5 mm. is obtained.

In practical use the grain size of an ion exchanger besides its chemical properties represents an important factor, since the size of the grains will determine not only the filter resistance but also the diffusion and the capacity of the exchanger. If the grain size of the exchanger is too fine, e.g. amounting to only 0.1 to 0.2 mm. its capacity will be higher than that of an exchanger with a coarser grain, however, at the same time its filter resistance will be higher, too. Accordingly, when producing the exchangers a grain of medium size, e.g. of about 0.5 to 0.7 mm. is preferred which should be as uniform as possible. When producing pellets by the said polymerisation grains of different sizes are obtained, so that the sizes which are unsuited for the exchanger must be eliminated. When using the copolymerization product obtained from monovinyl and divinyl benzene, this elimination will cause economical disadvantages since this copolymer owing to its cross-linkages is infusible and insoluble and cannot be used for other technical purposes. This means that the grain sizes which are unsuitable for preparing exchangers must be discarded.

The process of my invention is characterized by the advantage that the most favorable grains, e.g. such as 0.4 to 0.6 mm. may be separated by screening from the commercially available polystyrene and that the waste grains showing a lower or higher size-granulation are not worthless and lost but may be used for other technical purposes.

When operating according to the process of my invention, the sulfonation proper which may be carried out, e.g. by means of chlorosulfonic acid, oleum or concentrated sulfuric acid, is to be distinguished from the introduction of the methylene bridges which is obtained by a treatment with formaldehyde in the presence of a strong mineral acid acting as catalyst, e.g. sulfuric acid or hydrogen chloride, both showing a dehydrating action. Formaldehyde may be used in this process in the form of gaseous aldehyde or of paraformaldehyde or a similar material forming or yielding formaldehyde. It is most important that the process is carried out in the total absence of water. It is advantageous to maintain a constant agitation or stirring throughout all stages of the process.

The process may be carried out by first sulfonating either at room temperature, or more advantageously, with slowly raising the temperature up to the maximum temperature of 140° C. whereupon the cross-linkages are effected by means of methylene bridges (treatment with formaldehyde). Having reached a temperature of 80° to 90° C. an exothermic reaction sets in which is controlled by cooling. Thereupon the mass is heated up to a maximum temperature of 140° to 145° C.

Alternatively, it is possible, to simultaneously carry out the sulfonation and the formation of the cross-linkages, by dissolving e.g. paraformaldehyde in the sulfonating agent and by causing the solution obtained to react with polystyrene, either at room temperature during a period of several days, or while slowly heating up to e.g. 120° C.

With regard to the preservation or maintenance of the grains the process of simultaneously sulfonating and condensing the polystyrene proves to be less advantageous than a successive process with two steps.

The polystyrene after being sulfonated and condensed by cross-linkages according to this invention is obtained in the form of a sandy black product. Its acid excess must first be removed. If in the process of this invention chlorosulfonic acid is used, it is recommendable not to immediately wash or contact the sandy black product with water, since the decomposition of the excess acid may easily cause the grains to blow up and break. It is more advantageous to treat first the crude material with moist air, which may be blown through, until the development of hydrogen chloride is terminated and to carry out only thereupon the washing step. As the product still contains sulfochlorides, these must be converted according to suitable known methods, e.g. by using alkalis such as sodium carbonate into sodium salts of the sulfonic acid. In the process of this invention the proportion of the sulfonating agent to the polystyrene may be varied and the proportion of the cross-linking agent to the polystyrene may be varied. The reaction takes place between the polystyrene, the sulfonating agent and the formaldehyde. The sulfonating agent is reacted with the polystyrene in the proportion of two and one-half to three parts by weight of acid to one part of the polystyrene. The formaldehyde cross-linking agent may be used either simultaneously with the sulfonating agent or subsequent to the sulfonating agent. The formaldehyde is used in the proportion of three to five parts by weight of the formaldehyde cross-linking agent to twenty parts by weight of the polystyrene, referring to the polystyrene by its unsulfonated weight. The proportions are 2½ to 3 parts of acid to one part of polystyrene in the sulfonation. The sulfonation proceeds according to a reaction illustrated as follows:

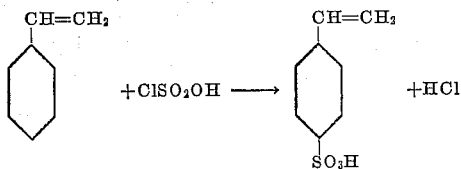

One sulfonic group is introduced as a substituent for one benzene nucleus.

The following examples are illustrating my invention without limiting it in any way.

*Example 1*

20 g. of polystyrene in the form of pearls or beads of the desired size mixed with 60 g. of chlorosulfonic acid and e.g. 3 g. of paraformaldehyde which are dissolved in the said acid, and the mixture is slowly heated up to 120° C. while stirring. Gradually a reaction takes place which starts at room temperature. In the course of warming the polystyrene turns red-yellow, then brown and finally black. The chlorosulfonic acid is being totally absorbed. During this process sulfonation and condensation is effected with evolution of hydrogen chloride. After the sulfochlorides are washed out and hydrolized with e.g. sodium carbonate, then washed again and dried, a yield of about 44 g. is obtained.

*Example 2*

2 g. of polystyrene in the form of beads of the desired size are sulfonated with 4 g. of chlorosulfonic acid, starting at room temperature which is gradually raised to e.g. 120° C. The acid is slowly absorbed by the polystyrene causing the product to turn yellow. With increasing temperature the color is turning red-yellow and then brown-black. Thereupon this sulfonation product is reacted, while stirring, with e.g. 2 g. of chlorosulfonic acid in which 0.3 to 0.4 g. of paraformaldehyde are dissolved. Simultaneously the temperature is raised to a maximum temperature of 135° C. Black beads are obtained which are worked up as described above.

*Example 3*

The sulfonation process is carried out according to Example 2 by heating 20 g. of polystyrene with e.g. 60 g. of chlorosulfonic acid up to 100° C., while slowly stirring. Thereupon, 4 g. of paraformaldehyde are added while stirring, the mixture is maintained at about 75° to 80° C. for about 1 to 2 hours, whereupon the temperature is slowly raised to 130° C. The entire process takes about 10 hours.

*Example 4*

The sulfonation process is carried out according to Example 2. After the sulfonation process is terminated gaseous formaldehyde is introduced into the slowly agitated charge, while slowly raising the temperature up to 120° C.

*Example 5*

20 g. of polystyrene together with 60 g. of oleum (65% $SO_3$) and 4 g. of paraformaldehyde are slowly heated up to 120° to 130° C. in the course of about 8 hours.

*Example 6*

20 g. of polystyrene are mixed with 50 g. of oleum (65%) and with 5 g. of paraformaldehyde dissolved in about 15 g. of chlorosulfonic acid while stirring, whereupon the mixture is slowly heated up to 110° C.

The crude products obtained according to the processes of these examples, which in a thin layer show a dark yellow-red appearance, in the form of grains, however, are of black color, are converted into the sodium salts of the sulfonic acids partly by a treatment with moist air, partly only by a water wash followed by neutralization with e.g. sodium carbonate. It may be necessary to carry out the last mentioned reaction at 100° C. The final products do not change, even upon being boiled in water and sodium carbonate solution. Depending on the process of production and on the used grain size respectively, exchanger capacities of about 34 to 48 g. of CaO per liter exchanger material are obtained.

I claim:

1. The process for preparing a cation exchange material comprising sulfonating polystyrene substantially free of cross-linking in the form of pellets of a size suitable for use as exchange material, by slowly heating the polystyrene pellets with chlorosulfonic acid up to 100° C. while stirring in the proportion of polystyrene to acid in the range of about 2½ to 3 parts by weight of the acid to one part by weight of the polystyrene and cross-linking product obtained by introducing gaseous formaldehyde into the stirred reaction mass in the proportion of polystyrene to formadehyde in the range of 20 parts by weight of the polystyrene to about 3 to 5 parts by weight of the formaldehyde and slowly raising the temperature up to 120° C., the cross-linking being effected in a water-free environment.

2. Process according to claim 1, which comprises removing the surplus of chlorosulfonic acid from the product obtained by sulfonation and condensation by treating it with humid air.

3. The process for preparing a cation exchange material comprising sulfonating polystyrene substantially free of cross-linking in the form of pellets of a size suitable for use as exchange material, by slowly heating it with chlorosulfonic acid up to 120° C. while stirring in the proportion of polystyrene to acid in the range of about 2½ to 3 parts by weight of the acid to one part by weight of the polystyrene and cross-linking product obtained by treating it with a solution of paraformaldehyde in chlorosulfonic acid in the proportion of polystyrene to formaldehyde in the range of 20 parts by weight of the polystyrene to about 3 to 5 parts by weight of the paraformaldehyde while stirring and slowly raising the temperature up to about 130° C.

4. A process of preparing a cation exchange material which comprises sulfonating polystyrene substantially free of cross-linking in its pulverulent form and having a predetermined particle size suitable for use as an ion exchange material with a sulfonating agent in the proportion of polystyrene to sulfonating agent in the range of about 2½ to 3 parts by weight of the agent to 1 part by weight of the polystyrene and cross-linking product obtained by introducing a cross-linking agent selected from the group consisting of formaldehyde and paraformaldehyde in the proportion of polystyrene to cross-linking agent in the range of 20 parts by weight of the polystyrene to about 3 to 5 parts by weight of cross-linking agent, the sulfonation and the cross-linking being effected while gradually raising the temperature of the reactants from room temperature up to 100° C. to 145° C., the cross-linking being effected in a water-free environment.

5. Cation exchange material obtained according to the process of claim 4.

6. The process of claim 4 wherein the condensation is effected after the sulfonation has taken place.

7. The process of claim 4 wherein the condensation is effected simultaneously with the sulfonation.

8. The process of claim 4 wherein the particle size of the pulverulent polystyrene is between about 0.4 to 0.7 mm.

References Cited in the file of this patent

UNITED STATES PATENTS

| | | |
|---|---|---|
| 2,597,438 | Bodamer | May 20, 1952 |
| 2,629,710 | McBurney | Feb. 24, 1953 |
| 2,658,042 | Johnson | Nov. 3, 1953 |
| 2,900,352 | Patterson et al. | Aug. 18, 1959 |